July 1, 1930.　　　T. P. ARCHER　　　1,769,095
COWL MOLDING AND LAMP BRACKET CONSTRUCTION
Filed July 5, 1928
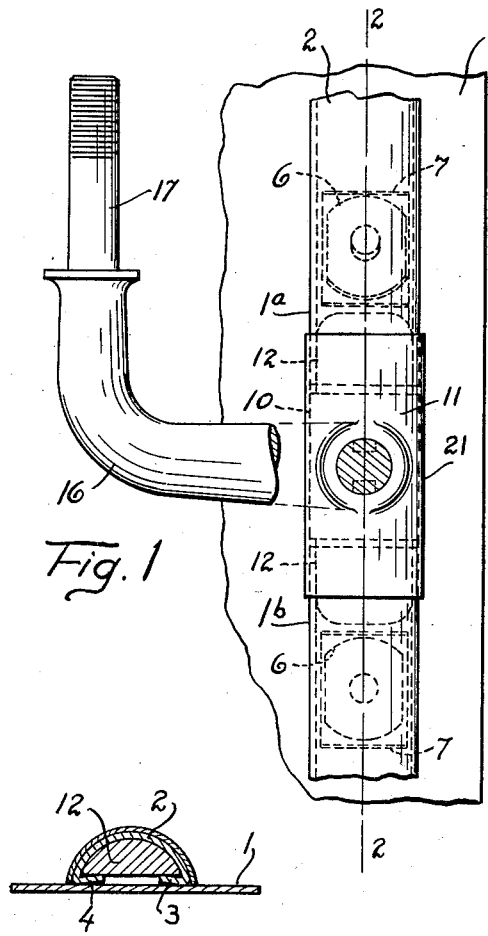
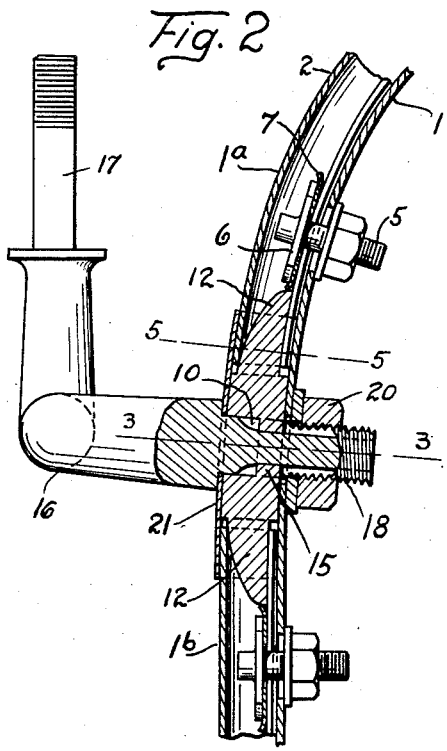
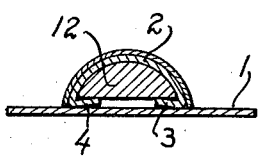
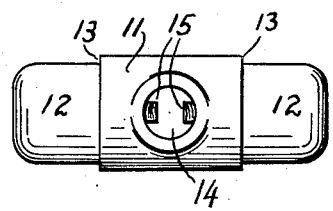
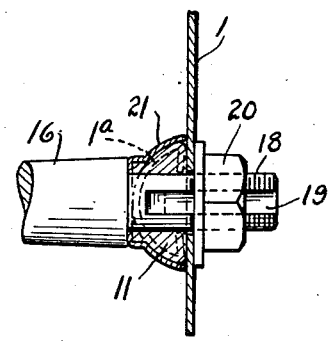
INVENTOR.
Thomas P. Archer
BY
*Stuart C. Barnes*
ATTORNEY.

Patented July 1, 1930

1,769,095

UNITED STATES PATENT OFFICE

THOMAS P. ARCHER, OF DETROIT, MICHIGAN, ASSIGNOR TO TERNSTEDT MANUFACTURING COMPANY, OF DETROIT, MICHIGAN, A CORPORATION OF MICHIGAN

COWL-MOLDING AND LAMP-BRACKET CONSTRUCTION

Application filed July 5, 1928. Serial No. 290,556.

This invention relates to a cowl molding and lamp bracket construction for an automobile. The present day vogue in the automobile industry is to provide a mounding around the cowl of the car, and attach lamps to the car by means of the bracket positioned at the cowl.

The object of the present invention is to provide a lamp bracket construction which is associated with the cowl molding. More particularly the invention aims to provide a lamp bracket construction which is especially adapted for use in conjunction with cowl molding, which is formed of a strip of flat stock fashioned transversely into bead form.

In the accompanying drawings:

Fig. 1 is a side view of the bracket molding as applied to the automobile cowl, illustrating in dotted lines some details of the parts used, and also showing in section the manner of mounting the bracket.

Fig. 2 is a sectional view taken on line 2—2 of Fig. 1.

Fig. 3 is a sectional view taken on line 3—3 of Fig. 2.

Fig. 4 is a detailed view of an insert member used for mounting the bracket.

Fig. 5 is a sectional view taken on line 5—5 of Fig. 2.

There is illustrated in Fig. 1 part of an automobile cowl 1, to which there is secured a molding 2. This molding is of bead formation and is constructed from flat stock fashioned transversely into hollow bead formation, and as shown in Fig. 1, has its edges 3 and 4 turned inwardly toward each other.

This molding, in accordance with the present invention, is made up in two or more pieces, there being one piece of molding 1ª, designed to fit over the top of the cowl, and another piece 1ᵇ, arranged to fit down along the side of the cowl. These two pieces are separated at the point where the lamp bracket is to be attached. This molding is attached to the cowl by bolts 5, which extend through suitable openings in cowl. These bolts are provided with heads 6 which are positioned within the hollow molding and overlying edges 3 and 4. Preferably there is a spring washer 7 between the bolt head and the edges 3 and 4.

The lamp bracket supporting construction consists of an insert piece 10, having a central portion 11, with ends 12 somewhat reduced in size thus providing shoulders 13. The ends 12 are designed to fit into the open ends of the hollow molding, as shown in Fig. 2, with the ends of the molding pieces 1ª and 1ᵇ coming into close proximity to the shoulders 13.

This insert member is preferably made of suitable metal and is provided with an aperture 14 having locking tongues 15. The lamp bracket 16, has a part 17 to which a lamp may be secured, and has a screw threaded part 18 arranged to fit through the aperture 14, and this screw threaded part has grooves 19 which co-operate with tongues 15. A suitable nut 20 is secured on the end of the projecting part 18, thus holding the lamp bracket in place.

For the purpose of covering the insert member and also the break between the two molding parts, there is a cover plate or escutcheon 21, which fits over the insert member and laps adjacent ends of the molding parts, as shown in Fig. 2.

It will be noted with this construction, that the molding holds the insert member 10 in proper alignment with the molding, and that inasmuch as the lamp bracket is secured to the molding by a tongue and groove connection, the lamp bracket will not turn in the insert member and accordingly is held in proper position.

In assembling the molding and lamp bracket construction upon the cowl of an automobile, there will occur at times slight variations either in the length of the molding parts or the shape of the cowl, which results in variation of the distance between the adjacent ends of the molding parts 1ª and 1ᵇ. It is a feature of this construction to take care of this variation. This is accomplished by reason of the slip connection between the ends of the molding parts and the insert member 10. This will be seen by reference to Fig. 2 where the molding part 1ª falls short of meeting shoulder 13, but this is nicely concealed by the cover plate or escutcheon 21. Thus the molding can be drawn down in nice fitting relation with the cowl.

What I claim is:

1. The combination with the cowl of an automobile, of a molding on the cowl consisting of two parts with their ends spaced from each other, a lamp bracket mounted on the cowl at the point between the spaced ends, and means associated with the lamp bracket which bridges the distance between the ends of the molding parts and completes the molding formation at this point.

2. The combination with the cowl of an automobile, of a molding on the cowl consisting of two parts with their ends spaced from each other, a lamp bracket mounted on the cowl at the point between the spaced ends, and means associated with the lamp bracket disposed between the ends of the molding parts and anchored to the molding parts for holding the lamp bracket in proper position and for completing the molding formation between the ends of the molding parts.

3. The combination with the cowl of an automobile, of a molding on the cowl consisting of two parts with their ends spaced from each other, a lamp bracket mounted on the cowl at the point between the two ends of the said molding parts, and a cover plate associated with the lamp bracket which bridges the distance between the ends of the molding parts and completes the cowl formation at this point.

4. The combination with the cowl of an automobile, of a hollow bead like molding on the cowl, a lamp bracket intermediate the ends of the molding, and means anchored inside the hollow molding for supporting the lamp bracket.

5. The combination with the cowl of an automobile of a hollow molding on the cowl, consisting of two parts with their ends in close proximity, a lamp bracket, and means disposed between the ends of the molding parts to which the lamp bracket is connected.

6. The combination with the cowl of an automobile, of a hollow molding on the cowl, consisting of two parts with their ends spaced from each other, a lamp bracket, means bridging the ends of the two parts and arranged to be held by the two parts, said lamp bracket being connected to and supported by this means, and a cover plate disposed over the said means and the ends of the molding parts.

7. The combination with the cowl of an automobile, of a hollow molding consisting of two parts with their ends of the parts in spaced relation, an insert member disposed between the ends of the molding parts and having a slip connection with at least one part to accommodate for variation in the distance between the ends of the parts, and a cover plate covering this insert member and the adjacent ends of the molding parts.

8. The combination with the cowl of an automobile, of a hollow molding consisting of two parts with the ends of the parts in spaced relation, an insert member disposed between the ends of the molding parts and having a slip conection with at least one part to accommodate for variation in the distance between the ends of the parts, a lamp bracket associated with this insert member which is held in proper position by reason of the insert being held in alignment with the molding parts, and a cover plate disposed over the insert member and the adjacent ends of the molding parts.

9. The combinaiton with the cowl of an automobile, of a hollow molding on the cowl consisting of two molding parts with their ends in spaced relation, an insert member having a slip connection with the ends of the molding parts, and which is held in alignment with the molding parts by its connection therewith, said insert member having an aperture therethrough, a lamp bracket having a stud portion extending through the aperture and cowl, means which keys the said portion of the lamp bracket to the insert whereby the lamp bracket is held in proper position.

10. The combination with the cowl of an automobile, of a hollow molding on the cowl consisting of two molding parts with their ends in spaced relation, an insert member having a slip connection with the ends of the molding parts, and which is held in alignment with the molding parts by its connection therewith, said insert member having an aperture therethrough, a lamp bracket having a stud portion extending through the aperture and cowl, means which keys the said portion of the lamp bracket to the insert whereby the lamp bracket is held in proper position, and a cover plate through which the said portion of the lamp bracket extends and which covers the insert and the adjacent ends of the molding parts.

11. The combination with the cowl of an automobile of a molding on the cowl consisting of at least two parts with the ends of the parts disposed in close proximity, a lamp bracket disposed substantially at the location of the said two ends of the molding parts, and means associated with the lamp bracket and molding which covers the joint between the said two ends of the molding parts.

In testimony whereof I affix my signature.

THOMAS P. ARCHER.